(12) United States Patent
Arbabi et al.

(10) Patent No.: US 9,995,930 B2
(45) Date of Patent: Jun. 12, 2018

(54) FOCUSING DEVICE COMPRISING A PLURALITY OF SCATTERERS AND BEAM SCANNER AND SCOPE DEVICE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Amir Arbabi, Pasadena, CA (US); Seunghoon Han, Seoul (KR); Andrei Faraon, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 179 days.

(21) Appl. No.: 15/093,987

(22) Filed: Apr. 8, 2016

(65) Prior Publication Data
US 2016/0299337 A1    Oct. 13, 2016

Related U.S. Application Data

(60) Provisional application No. 62/144,750, filed on Apr. 8, 2015.

(30) Foreign Application Priority Data

Feb. 5, 2016    (KR) .................... 10-2016-0014992

(51) Int. Cl.
*G02B 5/30*    (2006.01)
*G02B 27/00*    (2006.01)
(Continued)

(52) U.S. Cl.
CPC ....... *G02B 27/0031* (2013.01); *G02B 5/0263* (2013.01); *G02B 5/0294* (2013.01);
(Continued)

(58) Field of Classification Search
CPC .............. G02B 3/0087; G02B 27/0025; G02B 27/005; G02B 27/0068; G02B 1/00; G02B 1/002; G02B 1/005; G02B 1/007
(Continued)

(56) References Cited

U.S. PATENT DOCUMENTS

2009/0097381 A1    4/2009 Hamano et al.
2012/0328240 A1    12/2012 Ma et al.
(Continued)

FOREIGN PATENT DOCUMENTS

JP    4903590 B2    3/2012
KR    101429093 B1    8/2014

OTHER PUBLICATIONS

F. Aieta, P. Genevet, M. Kats, N. Yu, R. Blanchard, Z. Gaburro, F. Capasso, 'Aberration-free ultrathin flat lenses and axicons at telecom wavelengths based on plasmonic metasurfaces', Nano Letters, v. 12, pp. 4932-4936, 2012.*
(Continued)

*Primary Examiner* — Arnel C Lavarias
(74) *Attorney, Agent, or Firm* — Sughrue Mion, PLLC

(57) ABSTRACT

A focusing device includes a substrate and a plurality of scatterers provided at both sides of the substrate. The scatterers on the both sides of the focusing device may correct geometric aberration, and thus, a field of view (FOV) of the focusing device may be widened.

20 Claims, 27 Drawing Sheets

(51) Int. Cl.
- *G02B 5/02* (2006.01)
- *G02B 23/00* (2006.01)
- *G02B 27/09* (2006.01)
- *G02B 3/00* (2006.01)

(52) U.S. Cl.
CPC ........... *G02B 5/3083* (2013.01); *G02B 23/00* (2013.01); *G02B 27/005* (2013.01); *G02B 27/0927* (2013.01); *G02B 27/0955* (2013.01); *G02B 3/0087* (2013.01)

(58) Field of Classification Search
USPC ....... 359/362, 363, 619, 920, 621, 622, 623, 359/625, 626, 628, 642, 648, 651, 652, 359/653, 721, 724, 737, 741
See application file for complete search history.

(56) References Cited

U.S. PATENT DOCUMENTS

| | | | |
|---|---|---|---|
| 2014/0277433 A1 | 9/2014 | Pugh et al. | |
| 2015/0219806 A1* | 8/2015 | Arbabi | G02B 5/1828 |
| | | | 359/573 |
| 2016/0077261 A1* | 3/2016 | Arbabi | G02B 5/3025 |
| | | | 359/493.01 |
| 2016/0306079 A1* | 10/2016 | Arbabi | G02B 5/0263 |
| 2016/0320531 A1* | 11/2016 | Kamali | G02B 5/0263 |
| 2017/0045652 A1* | 2/2017 | Arbabi | G02B 5/1828 |

OTHER PUBLICATIONS

F. Aieta, P. Genevet, M. Kats, F. Capasso, 'Aberration of flat lenses and aplanatic metasurfaces', Optics Express, v. 21, No. 25, pp. 31530-31539, 2013.*

Caroline Perry, "Perfect colors, captured with one ultra-thin lens", Harvard John A. Paulson School of Engineering and Applied Sciences, Feb. 19, 2015, Total 7 pages, URL: http://www.seas.harvard.edu/news/2015/02/perfect-colors-captured-with-one-ultra-thin-lens.

Amir Arbabi et al., "Subwavelength-thick Lenses with High Numerical Apertures and Large Efficiency Based on High Contrast Transmitarrays", Physics.Optics, Oct. 30, 2014, Total 10 pages.

Amir Arbabi et al., "Aplanatic Metasurface Flat Lens", Apr. 23, 2015, Total 13 pages.

* cited by examiner

FOCUSING DEVICE COMPRISING A PLURALITY OF SCATTERERS AND BEAM SCANNER AND SCOPE DEVICE

CROSS-REFERENCE TO RELATED APPLICATIONS

This application claims the benefit of U.S. Provisional Patent Application 62/144,750, filed on Apr. 8, 2015, in the U.S. Patent and Trademark Office, and Korean Patent Application No. 10-2016-0014992, filed on Feb. 5, 2016, in the Korean Intellectual Property Office, the disclosures of which are incorporated herein in their entireties by reference.

This invention was made with government support under Grant No. W911NF-14-1-0345 awarded by the U.S. Army. The government has certain rights in the invention.

BACKGROUND

1. Field

Apparatuses and methods consistent with the present disclosure relate to a focusing device, and a beam scanner and a scope device that use the focusing device as an optical path modifier.

2. Description of the Related Art

Optical sensors using semiconductor-based sensor arrays are widely used in mobile devices, wearable devices, and the Internet of Things (IoT). Although size reduction of the aforementioned devices is desired, it is difficult to reduce the thickness of focusing devices in the aforementioned devices.

Also, due to the increased use of 3-dimensional (3D) image sensors in the IoT, gaming devices, and other mobile devices, focusing devices for adjusting a path of light incident on the 3D image sensors are required. However, the fields of view of the focusing devices may be limited by coma aberration of the focusing devices. Thus, research has been conducted to combine a plurality of optical lenses and thus remove coma aberration. However, since a substantial amount of space is necessary to combine a plurality of optical lenses, it is difficult to reduce the size of the focusing devices.

SUMMARY

Additional aspects will be set forth in part in the description which follows and, in part, will be apparent from the description, or may be learned by practice of the presented exemplary embodiments.

According to an aspect of an exemplary embodiment, a focusing device includes a substrate; a first thin lens provided at a first surface of the substrate and comprising a plurality of first scatterers; and a second thin lens provided at a second surface of the substrate and comprising a plurality of second scatterers. The first scatterers of the first thin lens are configured to correct geometric aberration (field curvature, coma aberration, astigmatism, etc.) of the second thin lens.

The first and second thin lenses may be configured to allow light to form a focusing point on a focal plane regardless of an angle at which light is incident on the first surface.

A phase shift of light that passes through the second scatterers may decrease from a central area of the second thin lens to a peripheral area of the second thin lens.

A phase shift of light that passes through the first scatterers may decrease from a peripheral area of the first thin lens to a middle area of the first thin lens and increases again from the middle area of the first thin lens to a central area of the first thin lens.

The first and second thin lenses may be configured to change a location at which light is focused on the focal plane according to the angle at which the light is incident on the first surface.

The first and second thin lenses area configured to determine the location at which the light may be focused on the focal plane according to Equation 1:

$$h = f^* \tan \theta$$

wherein 'h' is a distance between the location of the focusing point and an optical axis of the focusing device, 'f' is an effective focal length of the focusing device, and 'θ' is the incident angle of light.

Respective refractive indexes of the first and second scatterers may be greater than a refractive index of the substrate.

The substrate may include at least one selected from glass (fused silica, BK7, etc.), quartz, polymer (PMMA, SU-8, etc.) and plastic, and the first and second scatterers comprise at least one selected from crystalline silicon (c-Si), polycrystalline silicon (poly Si), amorphous silicon (a-Si), and group III-V compound semiconductors (GaP, GAN, GaAs, etc.), SiC, $TiO_2$, and SiN.

The first and second scatterers may be configured to allow incident light within a wavelength band to form a focusing point on a focal plane.

Distances between the first scatterers and distances between the second scatterers may be less than wavelengths in the wavelength band.

Respective heights of the first scatterers and respective heights of the second scatterers may be less than wavelengths in the wavelength band.

The focusing device may further include an optical filter configured to block the incident light of wavelengths of outside the wavelength band.

At least one of respective shapes of the first and second scatterers and respective sizes of the first and second scatterers may change according to a thickness of the substrate.

Each of the first and second scatterers may have at least one of a cylindrical shape, a cylindroid shape, and a polyhedral pillar shape.

According to another aspect of an exemplary embodiment, a beam scanner includes an optical path modifier comprising a substrate, a first thin lens provided at a first surface of the substrate and comprising a plurality of first scatterers, and a second thin lens provided at a second surface of the substrate and comprising a plurality of second scatterers; and a light source array spaced apart from the second surface of the substrate and comprising a plurality of light sources. The first scatterers of the first thin lens are configured to correct coma aberration of the second thin lens.

The optical path modifier may change path of light emitted from the light sources according to respective locations of the light sources.

The optical path modifier may modify light emitted from one of the light sources into parallel rays.

According to another aspect of an exemplary embodiment, a scope device includes an object lens unit comprising a substrate; a first thin lens provided at a first surface of the substrate and comprising a plurality of first scatterers, and a second thin lens provided at a second surface of the substrate and comprising a plurality of second scatterers; and a light source facing the second surface of the substrate and configured to emit light on a target object. The first scatterers of the first thin lens are configured to correct coma aberration of the second thin lens.

Light emitted by the light source may have at least two wavelengths with different transmission rates with respect to the target object.

The light emitted by the light source may be scattered at different locations by the target object according to wavelengths of the light emitted by the light source. The object lens unit may be configured to change a path of the light according to the locations at which the light is scattered by the target object.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
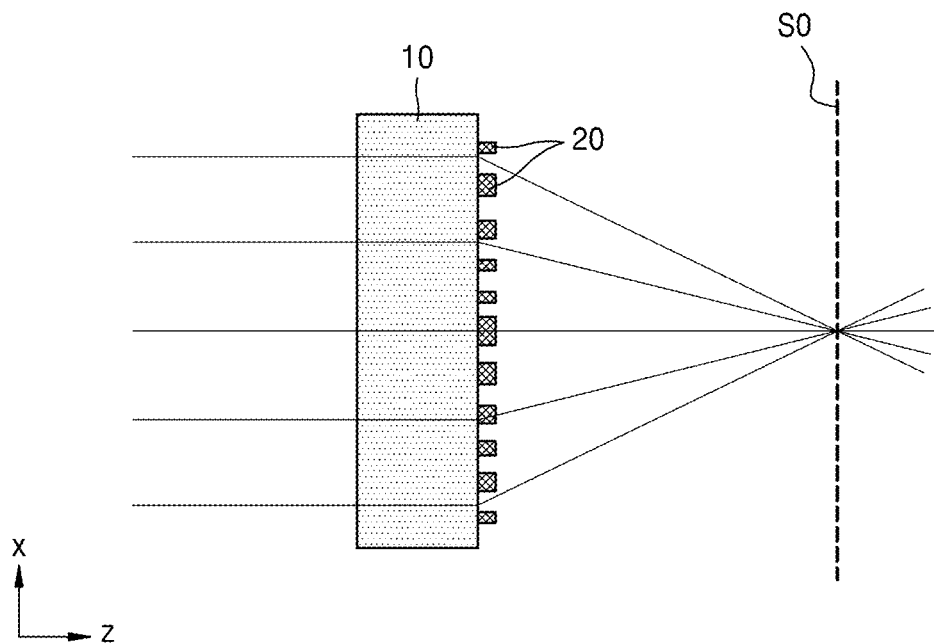
FIG. 1 is a diagram of a focusing device according to a comparative example.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Reference will now be made in detail to exemplary embodiments, examples of which are illustrated in the accompanying drawings.

The terms used in the exemplary embodiments are selected as general terms used currently as widely as possible considering the functions in the present disclosure, but they may depend on the intentions of one of ordinary skill in the art, practice, the appearance of new technologies, etc. In specific cases, terms arbitrarily selected by the applicant are also used, and in such cases, their meaning will be described in detail. Thus, it should be noted that the terms used in the specification should be understood not based on their literal names but by their given definitions and descriptions through the specification.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements. In addition, the terms such as "unit," "-er (-or)," and "module" described in the specification refer to an element for performing at least one function or operation, and may be implemented in hardware, software, or the combination of hardware and software.

The terms "configured of" or "includes" should not be construed as necessarily including all elements or operations described in the specification. It will be understood that some elements and some operations may not be included, or additional elements or operations may be further included.

While such terms as "first," "second," "A," "B," etc., may be used to describe various components, such components must not be limited to the above terms. The above terms are used only to distinguish one component from another.

The present exemplary embodiments may have different forms and should not be construed as being limited to the descriptions set forth herein. Elements and features that may be easily derived by one of ordinary skill in the art to which the present disclosure pertains are within the spirit and scope of the present disclosure as defined by the appended claims. Hereinafter, the present exemplary embodiments will be described with reference to the accompanying drawings.

FIG. 1 is a diagram of a focusing device according to a comparative example.

Referring to FIG. 1, the focusing device according to the comparative example may include a substrate 10 and a plurality of scatterers 20 provided at a side of the substrate 10. In the focusing device of FIG. 1, a path of light exiting the substrate 10 may change as light passes through the plurality of scatterers 20. Shapes and materials of the plurality of scatterers 20 may vary according to functions performed by the plurality of scatterers 20. For example, the plurality of scatterers 20 of the focusing device of FIG. 1 may have a shape and a size appropriate for performing a function of a lens with positive refractive power. Also, as shown in FIG. 1, the plurality of scatterers 20 may allow light that is perpendicularly incident on the substrate 10 to form a focusing point at a focal plane S0.

Figure 2:
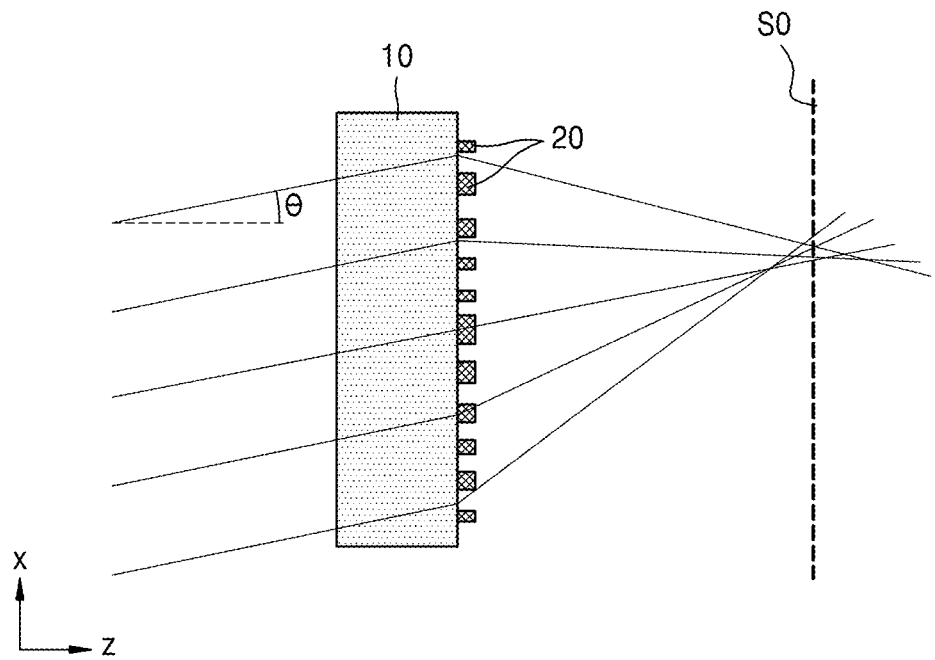
FIG. 2 is a diagram of an example in which light is obliquely incident with respect to an optical axis of the focusing device of FIG. 1.

FIG. 2 is a diagram of an example in which light is obliquely incident with respect to an optical axis (z-axis) of the focusing device of FIG. 1;

Referring to FIG. 2, light incident in a direction that is not parallel to the optical axis of the focusing device may pass through the plurality of scatterers 20 but not focus on a single focusing point. Such phenomenon is referred to as geometric aberration. The geometric aberration may include coma aberration and field of curvature aberration. The aforementioned geometric aberration may decrease sharpness of images formed by the focusing device. Also, the geometric aberration limits a field of view (FOV) of the focusing device.

Figure 3A:
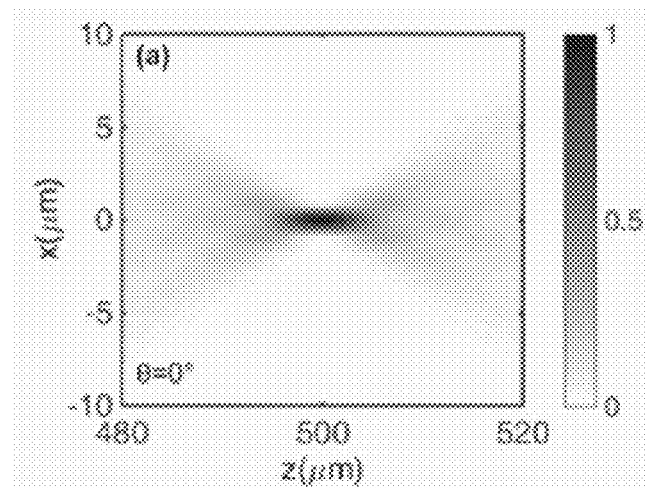
FIGS. 3A to 3C are diagrams of light intensity distribution of a focal plane.
Figure 3B:
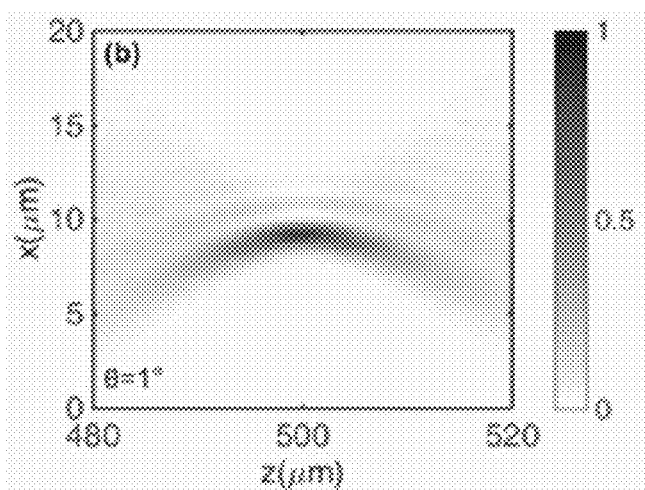
Figure 3C:
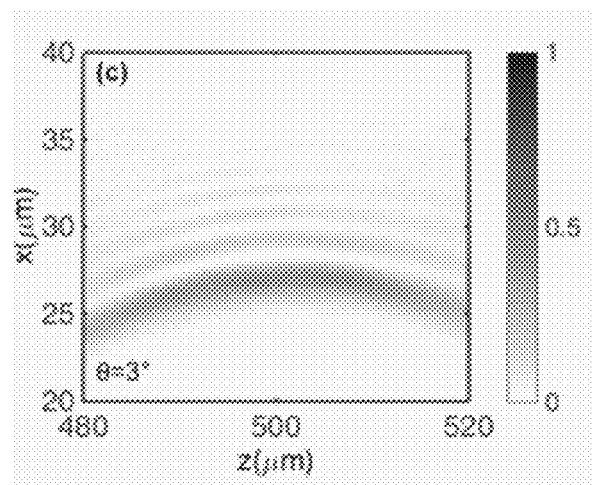

FIGS. 3A to 3C are diagrams of light intensity distribution of a focal plane.

FIG. 3A shows light intensity distribution of an image formed by light that is parallel to the optical axis (z-axis) of the focusing device. FIG. 3B shows light intensity distribution of an image formed by light incident at an incident angle of 1° with respect to the optical axis. FIG. 3C shows light intensity distribution of an image formed by light incident at an incident angle of 3° with respect to the optical axis. Bars at a right hand side of FIGS. 3A to 3B indicates relative intensity of light.

Referring to FIG. 3A, when an incident angle of light is 0° (i.e., when light is parallel to the optical axis of the focusing device), an area with high light intensity distribution may be narrow. That is, a focusing effect of the focusing device may be relatively excellent. Referring to FIG. 3B, when the incident angle of light is 1°, an area with high intensity of light is wide. As the incident angle of light increases, the focusing effect of the focusing device may decrease. Referring to FIG. 3C, when the incident angle of light is 3°, intensity of light may decrease in a central area of the image. However, peripheral areas of the image may have greater intensity of light as the incident angle increases. That is, even when the incident angle of light increases by a small amount, the focusing effect of the focusing device may substantially decrease.

Figure 4A:
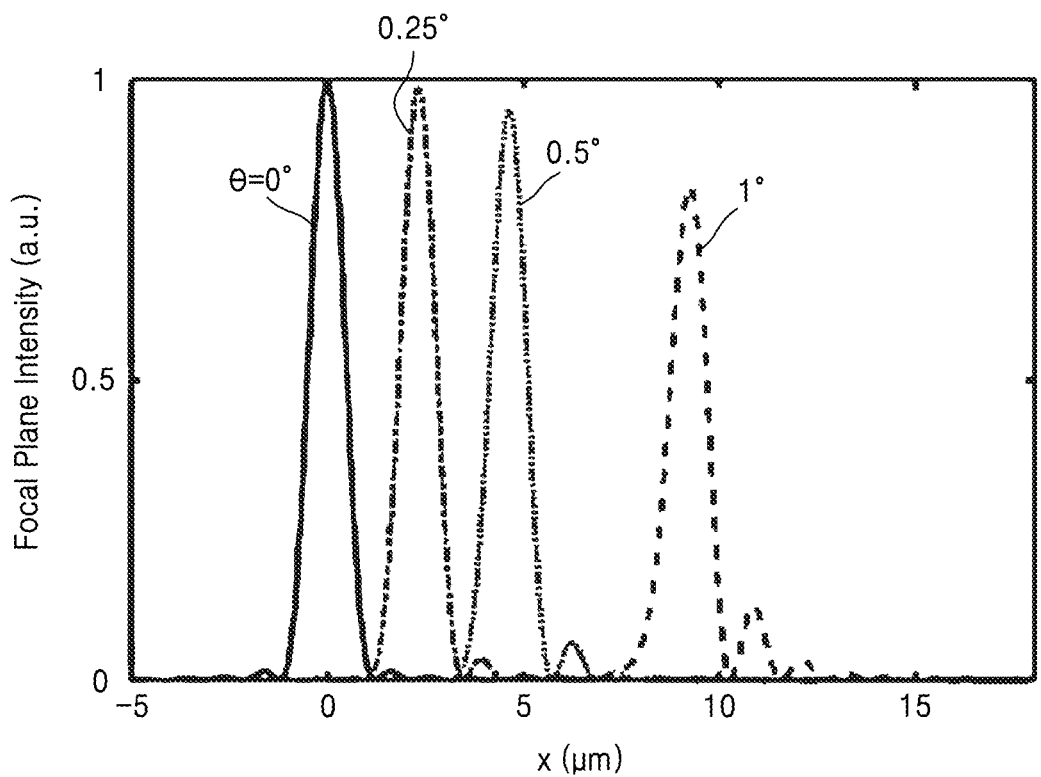
FIGS. 4A and 4B are diagrams of light intensity distribution on the focal plane according to incident angles of light.
Figure 4B:
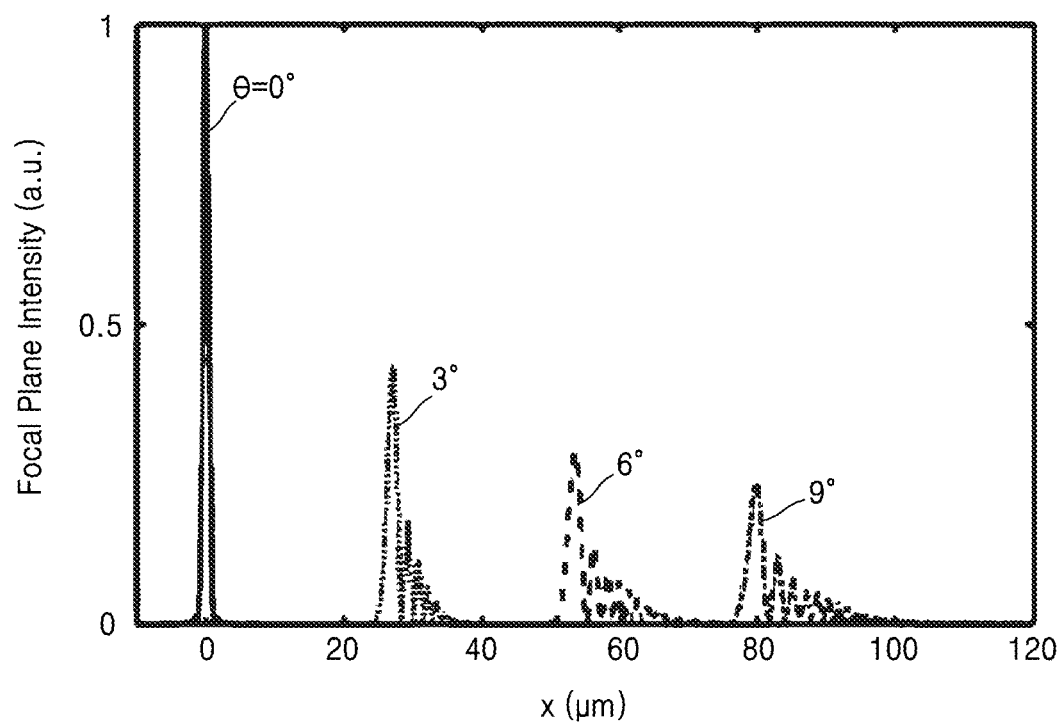

FIGS. 4A and 4B are diagrams of light intensity distribution on the focal plane S0 according to incident angles of light.

Referring to FIG. 4A, as the incident angle of light increases, peaks may be differently located in a graph of light intensity distribution. Also, as the incident angle increases, the graph of light intensity distribution may be widened and peak values may decrease. Referring to FIG. 4B, when the incident angle is 3° or higher, peak values of the light intensity distribution may decrease below more than half of peak values of when the incident angle is 0°. Also, a range of light intensity distribution may substantially increase. When the incident angle of light exceeds about 1°, image distortion due to coma aberration may increase.

Figure 5:
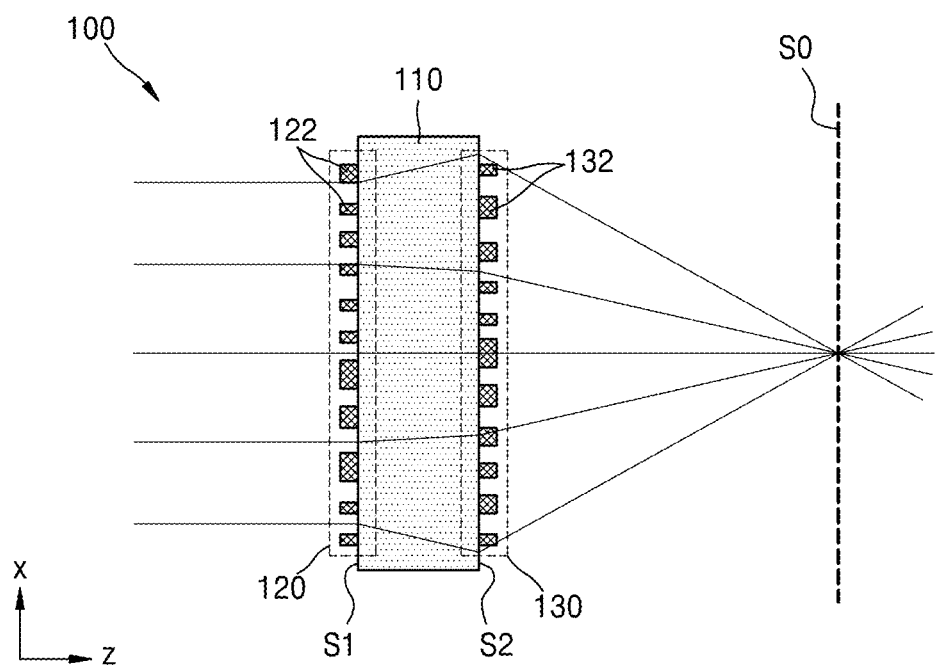
FIG. 5 is a focusing device according to an exemplary embodiment.

FIG. 5 is a focusing device 100 according to an exemplary embodiment.

Referring to FIG. 5, the focusing device 100 according to an exemplary embodiment may include a substrate 110, a first thin lens 120 including a plurality of first scatterers 122 provided on a first surface S1 of the substrate 110, and a second thin lens 130 including a plurality of second scatterers 132 provided on a second surface S2 of the substrate 110.

The substrate 110 may be shaped as a plate. The first and second surfaces S1 and S2 of the substrate 110 may be substantially parallel to each other. However, the first and second surfaces S1 and S2 do not have to be completely parallel to each other but may be oblique with respect to each other. The substrate 110 may include a transparent material. The transparent material indicates a material with a high light transmission rate. For example, the substrate 110 may include at least one selected from glass (fused silica, BK7, etc.), quartz, polymer (PMMA, SU-8, etc.), and plastic.

The first thin lens 120 may include the plurality of first scatterers 122 that are arranged on the first surface S1 of the substrate 110. Also, the second thin lens 130 may include the plurality of second scatterers 132 that are arranged on the second surface S2 of the substrate 110. Unlike optical lenses of the related art, the first and second thin lenses 120 and 130 may change a path of light by using the plurality of first and the plurality of second scatterers 122 and 132. The plurality of first and the plurality of second scatterers 122 and 132 may capture light incident near one another and resonate light inside the plurality of first and the plurality of second scatterers 122 and 132. The plurality of first and the plurality of second scatterers 122 and 132 may adjust transmission and reflection properties of the light incident on the plurality of first and the plurality of second scatterers 122 and 132. For example, the plurality of first and the plurality of second scatterers 122 and 132 may modulate at least one of an amplitude, phase, and polarization of transmitted light according to structures and included materials of the plurality of first and the plurality of second scatterers 122 and 132. The plurality of first and the plurality of second scatterers 122 and 132 may be arranged such that distribution of at least one of an amplitude, phase, and polarization of the transmitted light is modulated and thus a wavefront of the transmitted light changes with respect to a wavefront of the incident light. Therefore, the plurality of first and the plurality of second scatterers 122 and 132 may change a proceeding direction of the transmitted light with respect to that of the incident light.

The second thin lens 130 may function as a lens with positive refractive power. Shapes, sizes, materials, and an arrangement pattern of the plurality of second scatterers 132 may be modified so that the second thin lens 130 has positive refractive power. Also, the plurality of second scatterers 132 may be designed such that the second thin lens 130 does not cause spherical aberration. To do so, the shapes, the sizes, the materials, and the arrangement of the plurality of second scatterers 132 may vary according to a location on a surface of the substrate 110 where the plurality of second scatterers 132 are arranged.

Figure 6:
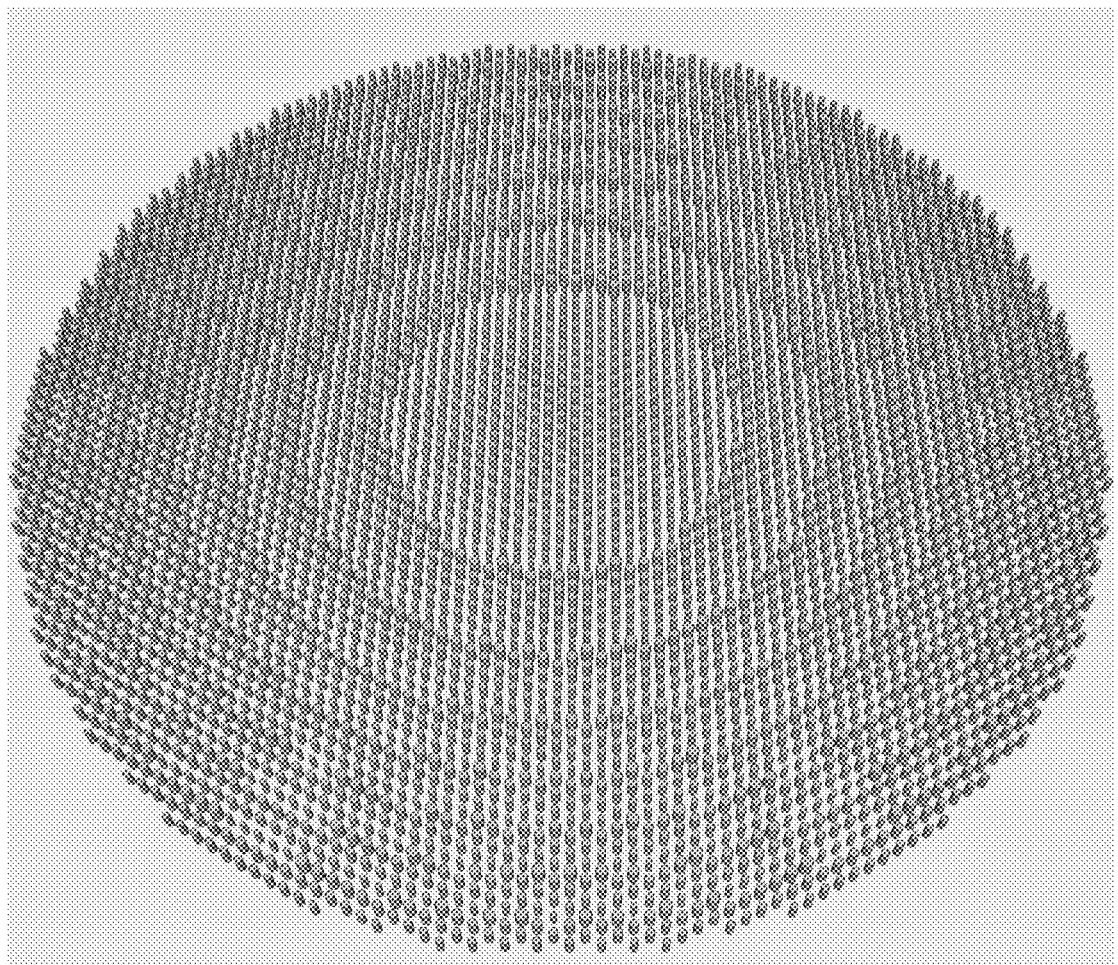
FIG. 6 is an exemplary diagram of a surface of a second thin lens.

FIG. 6 is an exemplary diagram of a surface of the second thin lens 130.

Referring to FIG. 6, the plurality of second scatterers 132 may be arranged on the surface of the second thin lens 130. Waveform of light that passed through the second thin lens 130 may vary according to shapes, arrangement intervals, and an arrangement pattern of the plurality of second scatterers 132. When the plurality of second scatterers 132 are arranged on the surface of the second thin lens 130 as shown in FIG. 6, the second thin lens 130 may function as a lens with positive refractive power.

The plurality of first scatterers 122 of the first thin lens 120 may be designed to correct coma aberration of the second thin lens 130. Shapes, materials, and arrangement pattern of the plurality of first scatterers 122 may vary depending on a thickness of the substrate 110 and the shapes, the materials, and the arrangement pattern of the plurality of second scatterers 132. In a general optical system, a plurality of optical lenses are combined to correct coma aberration of lenses. Therefore, the general optical system may be difficult to design and size reduction may be difficult. However, the focusing device 100 according to an exemplary embodiment may have the first and second thin lenses 120 and 130 on both surfaces of the substrate 110 by arranging the plurality of first and plurality of second scatterers 122 and 132 on the both surfaces of the substrate 110. Accordingly, size reduction of the focusing device 100 may become convenient. Also, since the first thin lens 120 may correct coma aberration of the second thin lens 130, the focusing device 100 may have a wide FOV.

Figure 7A:
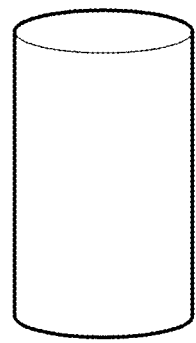
FIGS. 7A to 7C are perspective views of various shapes of first and second scatterers.
Figure 7B:
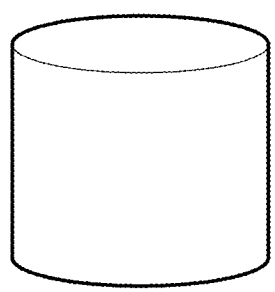
Figure 7C:
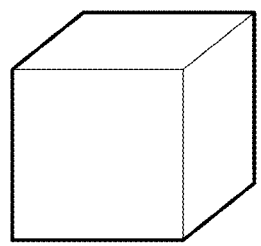

FIGS. 7A to 7C are perspective views of various shapes of the individual scatterers of plurality of first and plurality of second scatterers 122 and 132.

Referring to FIGS. 7A to 7C, the individual scatterers of the plurality of first and the individual scatterers of the plurality of second scatterers 122 and 132 in the first and second thin lenses 120 and 130 may have a pillar structure. Such pillar structure may have any one of circular, oval, rectangular, and square cross-sections. FIG. 7A shows a scatterer shaped as a pillar with a circular cross-section. FIG. 7B shows a scatterer shaped as a pillar with an oval cross-section. FIG. 7C shows a scatterer shaped as a pillar with a quadrilateral cross-section. The pillar structure may be inclined at an angle in a height direction.

Although exemplary shapes of the plurality of first and the plurality of second scatterers 122 and 132 are shown in FIGS. 7A to 7C, exemplary embodiments are not limited thereto. For example, the plurality of first and plurality of second scatterers 122 and 132 may be shaped as polyhedral pillars or pillars with an L-shaped cross-section. The shapes of the plurality of first and plurality of second scatterers 122 and 132 may be asymmetrical in a direction. For example, respective cross-sections of the plurality of first and the plurality of second scatterers 122 and 132 may be asymmetrical in a horizontal direction. Also, since the respective cross-sections of the plurality of first and the plurality of second scatterers 122 and 132 may vary according to respective heights of the plurality of first and the plurality of second scatterers 122 and 132, respective shapes of the plurality of first and the plurality of second scatterers 122 and 132 may be asymmetrical with respect to the respective heights thereof.

Respective refractive indexes of the plurality of first and the plurality of second scatterers 122 and 132 may be higher than a refractive index of the substrate 110. For example, the respective refractive indexes of the plurality of first and the plurality of second scatterers 122 and 132 may be greater than the refractive index of the substrate 110 by approximately 1 or more. Therefore, the substrate 110 may include a material with a relatively low refractive index, and the plurality of first and the plurality of second scatterers 122 and 132 may include a material with a relatively high refractive index. For example, the plurality of first and the plurality of second scatterers 122 and 132 may include at least one selected from crystalline silicon (c-Si), polycrystalline silicon (poly Si), amorphous silicon, $Si_3N_4$, GaP, GaAs, $TiO_2$, AlSb, AlAs, AlGaAs, AlGaInP, BP, and $ZnGeP_2$. The plurality of first and the plurality of second scatterers 122 and 132 may be additionally surrounded by materials with a low refractive index ($SiO_2$, polymer (PMMA, SU-8, etc.)) in upper and horizontal directions.

Figure 8A:
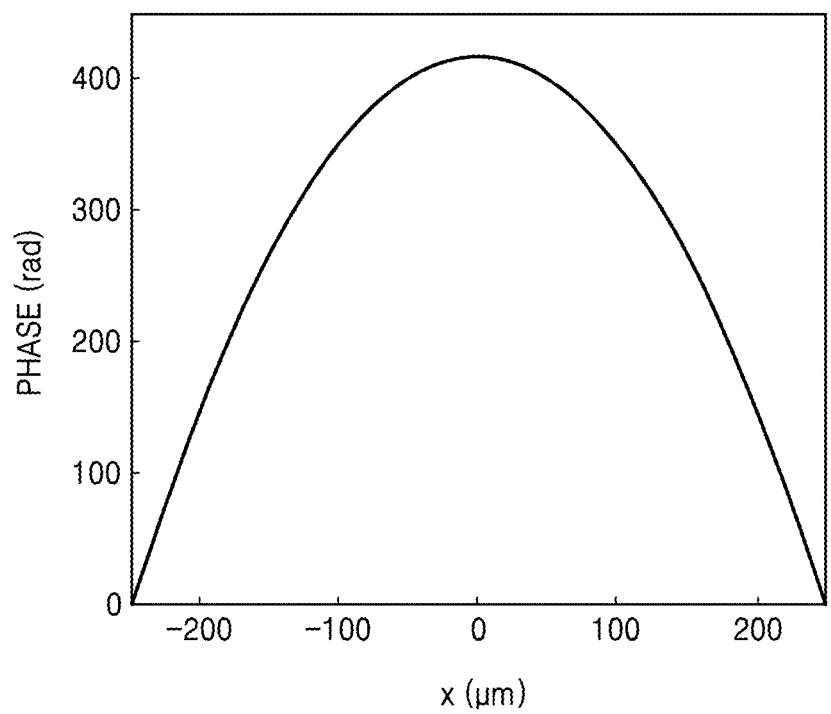
FIG. 8A is a phase profile of a second thin lens.

FIG. 8A is a phase profile of the second thin lens 130.

Referring to FIG. 8A, a phase shift of light incident on the second thin lens 130 may decrease from a central area of the second thin lens 130 to a peripheral area of the second thin lens 130. When the second thin lens 130 is configured such that the phase profile shown in FIG. 8A is satisfied, the second thin lens 130 may function as a lens with positive refractive power. Also, spherical aberration that occurs in general optical lenses may be decreased. The phase profile of the second thin lens 130 shown in FIG. 8A is merely exemplary, and exemplary embodiments are not limited thereto. For example, a shape of the phase profile may be changed according to a diameter, a focal length, etc. of the second thin lens 130 changes.

Design conditions of the plurality of second scatterers 132 in the second thin lens 130 may be modified according to the phase profile of the second thin lens 130. For example, at least one of the shapes, the sizes, the materials, and the arrangement pattern of the plurality of second scatterers 132 may be modified according to an arranged location of the plurality of second scatterers 132 on the surface of the substrate 110. The shapes, the sizes, the materials, and the arrangement pattern of the plurality of second scatterers 132 may be determined according to an amount of unwrapped phase shift of light that passes through the plurality of second scatterers 132. The amount of unwrapped phase shift indicates a phase component corresponding to a phase shift value between 0 and $2\pi$ remaining after subtracting an integer multiple of $2\pi$ from an amount of phase shift. Respective structures and materials of the plurality of first and the plurality of second scatterers 122 and 132 may vary according to the amount of unwrapped phase shift of light that passes through the plurality of first and the plurality of second scatterers 122 and 132.

Figure 8B:
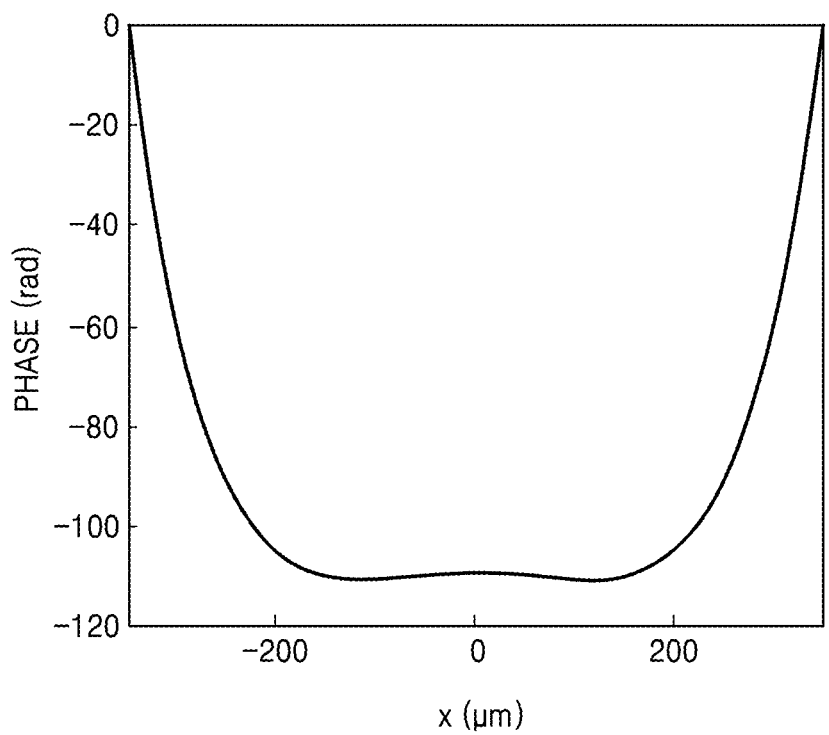
FIG. 8B is a diagram of a phase profile of a first thin lens.

FIG. 8B is a diagram of a phase profile of the first thin lens 120.

Referring to FIG. 8B, a phase shift of light incident on the first thin lens 120 may decrease from a peripheral area of the first thin lens 120 to a middle area of the first thin lens 120 and then increase again from the middle area of the first thin lens 120 to a central area of the first thin lens 120. For example, as shown in FIG. 8B, the first thin lens 120 may have a phase profile in which the phase shift of the incident light decreases from the central area to a middle area having a diameter of approximately 150 μm and increases from the middle area to the peripheral area. When the first thin lens 120 is configured such that the phase profile shown in FIG. 8B is satisfied, the first thin lens 120 may change a path of the incident light and thus correct coma aberration of the second thin lens 130. The phase profile of the first thin lens 120 shown in FIG. 8B is merely exemplary, and exemplary embodiments are not limited thereto. For example, a specific shape of the phase profile of the first thin lens 120 may be changed according to a diameter, a focal length, etc. of the first thin lens 120. Also, the specific shape of the phase profile of the first thin lens 120 may be changed according to the phase profile of the second thin lens 130 and the thickness of the substrate 110.

Figure 9:
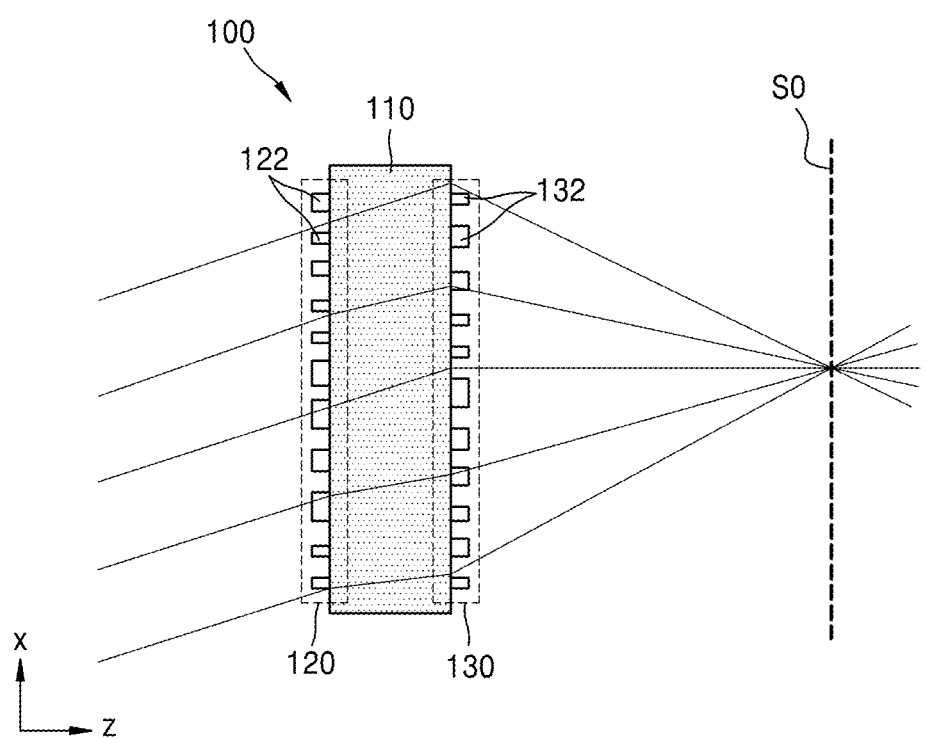
FIG. 9 is an exemplary diagram of a path of light incident on the focusing device of FIG. 5.

FIG. 9 is an exemplary diagram of a path of light incident on the focusing device 100 of FIG. 5.

Referring to FIG. 9, light may be incident on the focusing device 100 in a direction that is not parallel to the optical axis (z-axis) of the focusing device 100. A path of light incident on the first thin lens 120 may be changed by the plurality of first scatterers 122. After the path is changed by the plurality of first scatterers 122, the light may pass through the substrate 110, and the path of the light may be changed again by the plurality of second scatterers 132. The first and second thin lenses 120 and 130 may correct coma aberration of one another. Also, the first and second thin lenses 120 and 130 may allow the light to form a focusing point on the focal plane S0 regardless of angles at which light is incident on the first surface S1 of the substrate 110.

Figure 10A:
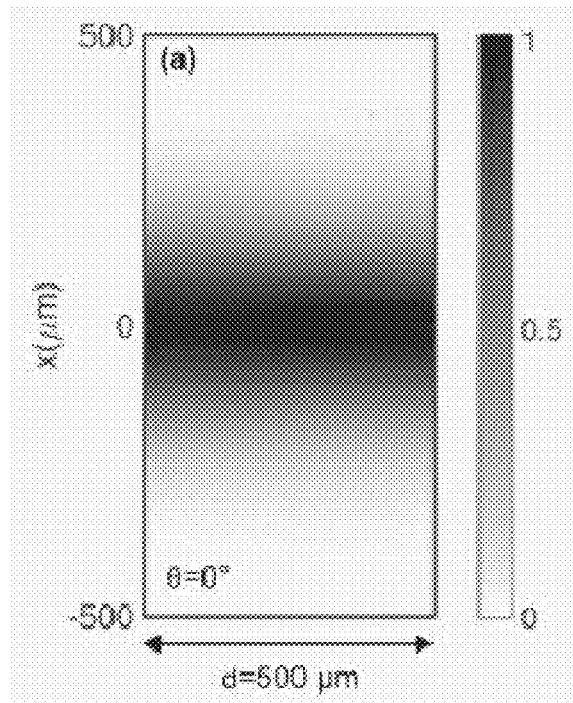
FIGS. 10A and 10B are diagrams of light intensity distribution in a substrate in the focusing device of FIG. 5.
Figure 10B:
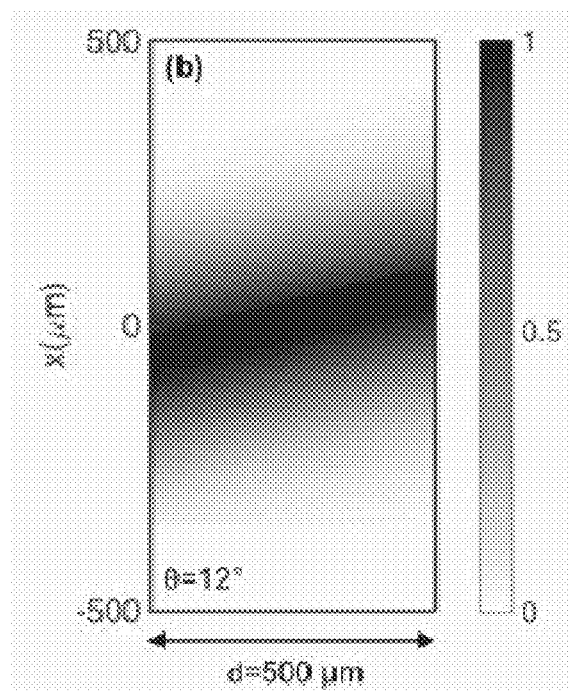

FIGS. 10A and 10B are diagrams of light intensity distribution inside the substrate 110 in the focusing device 100 of FIG. 5.

FIG. 10A shows an example in which light is incident in a direction parallel to an optical axis of the focusing device 100, and FIG. 10B shows an example in which light is obliquely incident (at an incident angle of 12°) with respect to the optical axis of the focusing device 100. Referring to FIGS. 10A and 10B, light intensity distribution in the substrate 110 may vary according to an incident angle of light because the plurality of first scatterers 122 change a path of light that proceeds into the substrate 110. Also, coma aberration of the focusing device 100 may be corrected by changing the light intensity distribution in the substrate 110.

FIGS. 11A to 11F are diagrams of light intensity distribution of an image formed on the focal plane S0 by the focusing device 100 of FIG. 5.

Figure 11A:
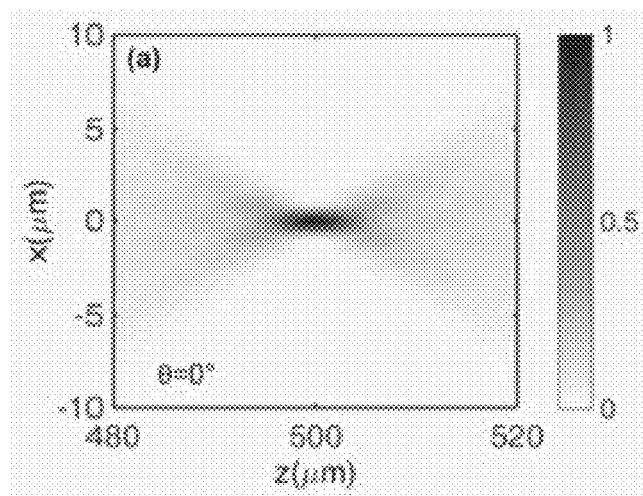
FIGS. 11A to 11F are diagrams of light intensity distribution of an image formed on a focal plane by the focusing device of FIG. 5.
Figure 11B:
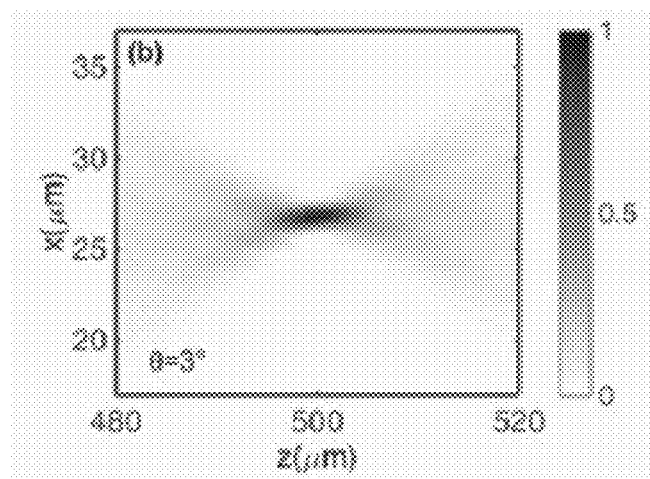
Figure 11C:
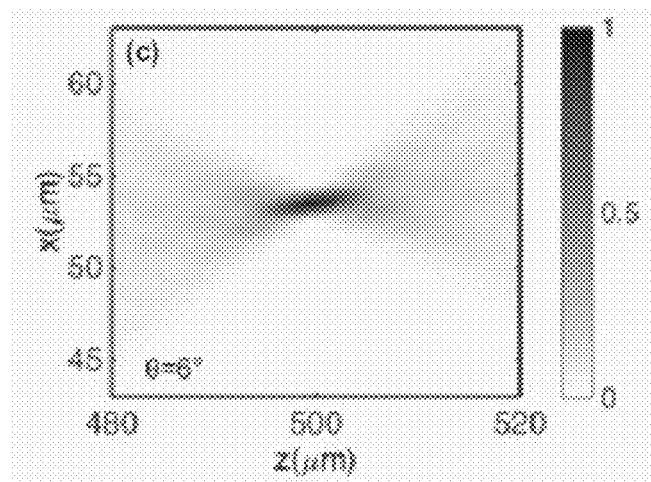
Figure 11D:
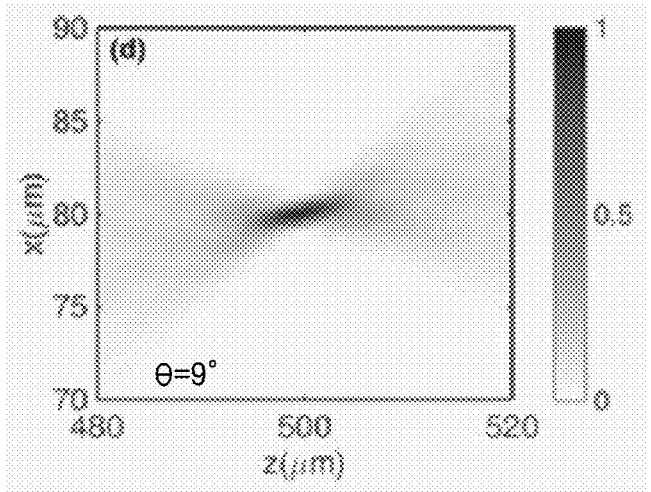
Figure 11E:
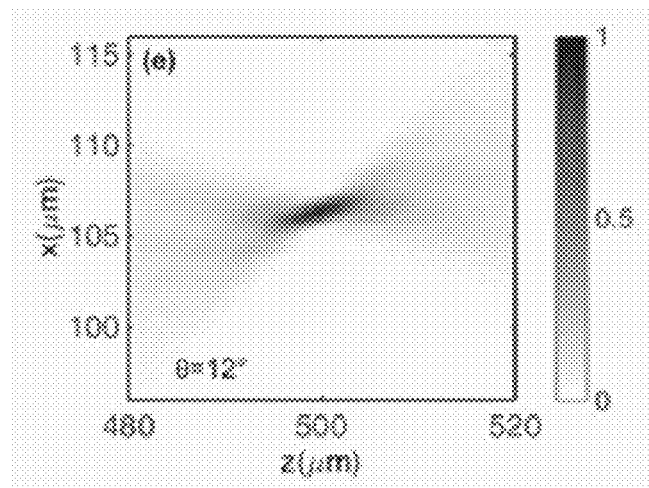
Figure 11F:
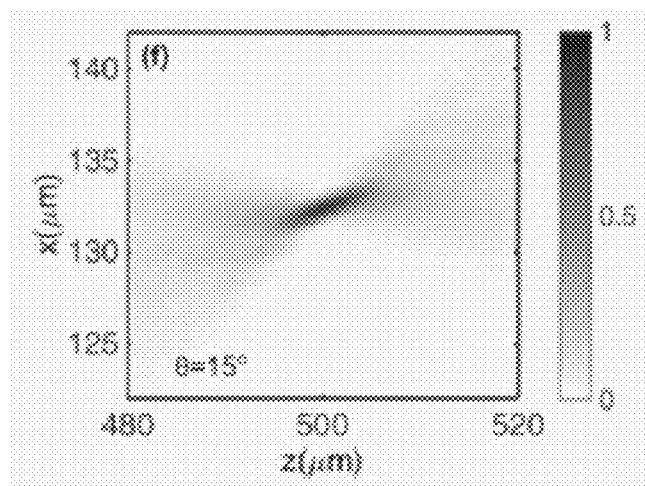

FIG. 11A shows light intensity distribution of an image formed by light incident in parallel to an optical axis of the focusing device 100. FIG. 11B shows light intensity distribution of an image formed by light incident at an incident angle of 3°. FIG. 11C shows light intensity distribution of an image formed by light incident at an incident angle of 6°. FIG. 11D shows light intensity distribution of an image formed by light incident at an incident angle of 9°. FIG. 11E shows light intensity distribution of an image formed by light incident at an incident angle of 12°. FIG. 11F shows light intensity distribution of an image formed by light incident at an incident angle of 15°. Bars at a right hand side of FIGS. 11A to 11F indicates intensity of light.

Referring to FIGS. 11A to 11F, a location of a focusing point may change as an incident angle of light changes from 0° to 15°. However, a shape of light intensity distribution may nearly not change at the location of the focusing point. By using the focusing device 100 of FIG. 5, intensity of light at the focusing point may be almost maintained at a steady rate even when the incident angle of light changes. Also, unlike FIGS. 3A to 3C, the focusing device 100 of FIG. 5 may prevent defocusing even when the incident angle of light increases.

Figure 12:
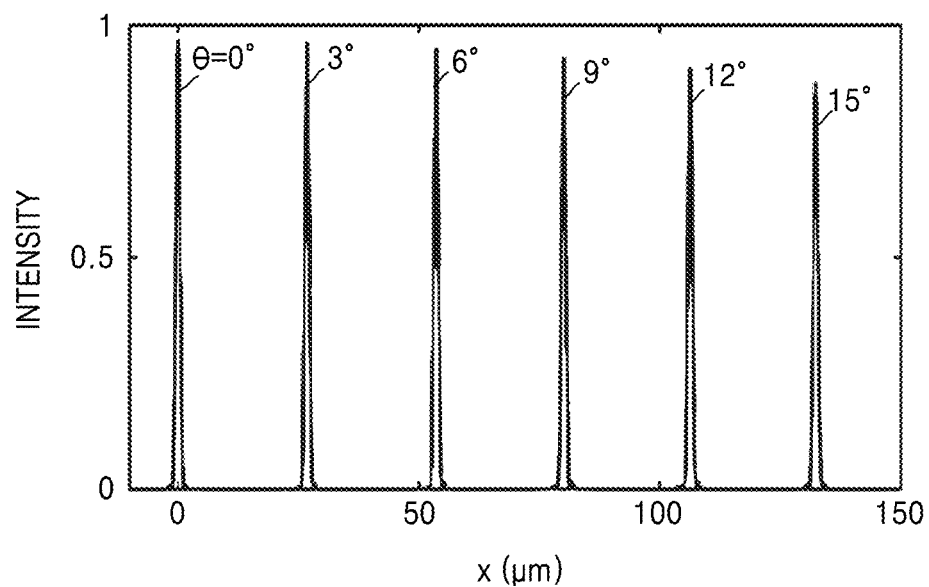
FIG. 12 is a graph of light intensity distribution of an image formed on a focal plane by the focusing device of FIG. 5.

FIG. 12 is a graph of light intensity distribution of an image formed on the focal plane S0 by the focusing device 100 of FIG. 5.

Referring to FIG. 12, a location of a focusing point may change as an incident angle changes from 0° to 15°. However, a shape and a peak of light intensity distribution graph may almost not change at the location of the focusing point. Also, unlike FIGS. 4A and 4B, the graph may show only one peak instead of a plurality of peaks even when the incident angle of light increases. As shown in FIG. 12, coma aberration of the focusing device 100 may be corrected. Therefore, even when the incident angle of light changes, the shape of the light intensity distribution may almost not change at the focusing point. Also, the focusing device 100 may have a wide FOV.

Figure 13:
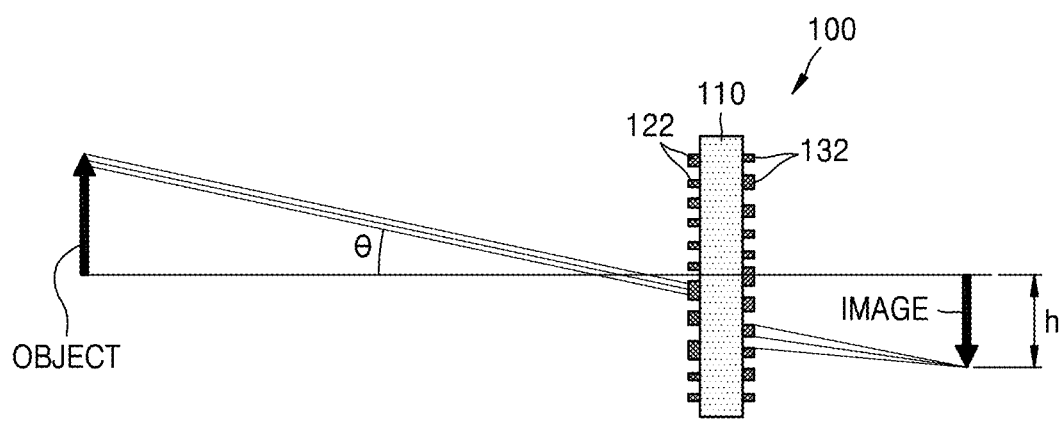
FIG. 13 is an exemplary diagram of forming an image of an object by a focusing device.

FIG. 13 is an exemplary diagram of forming an image of an object by the focusing device 100.

For convenience, the focusing device 100 and an image are enlarged in FIG. 13 and are not drawn to scale. However, an actual distance between an object and the focusing device 100 and a size of the object may be substantially different from a height of the focusing device 100. Therefore, when light reflected from a point of the object is incident on the focusing device 100, the light may be substantially parallel rays. Referring to FIG. 13, a distance h between a location of a focusing point and an optical axis of the focusing device 100 may vary according to an angle θ at which light is incident. For example, when the focusing device 100 is designed such that image distortion is not created, the distance h between the location of the focusing point and the optical axis of the focusing device 100 may satisfy Equation 1.

$$h = f * \tan\theta \qquad \text{[Equation 1]}$$

In Equation 1, 'h' is the distance between the location of the focusing point and the optical axis of the focusing device 100, 'f' is an effective focal length of the focusing device 100, and 'θ' is an incident angle of light.

As another example, when the focusing device 100 is provided as an orthographic fisheye lens to enlarge the FOV of the focusing device 100, the distance h between the location of the focusing point and the optical axis of the focusing device 100 may satisfy Equation 2

$$h = f * \sin\theta \qquad \text{[Equation 2]}$$

In Equation 2, 'h' is the distance h between the location of the focusing point and the optical axis of the focusing device 100, 'f' is an effective focal length of the focusing device 100, and 'θ' is an incident angle of light.

Figure 14:
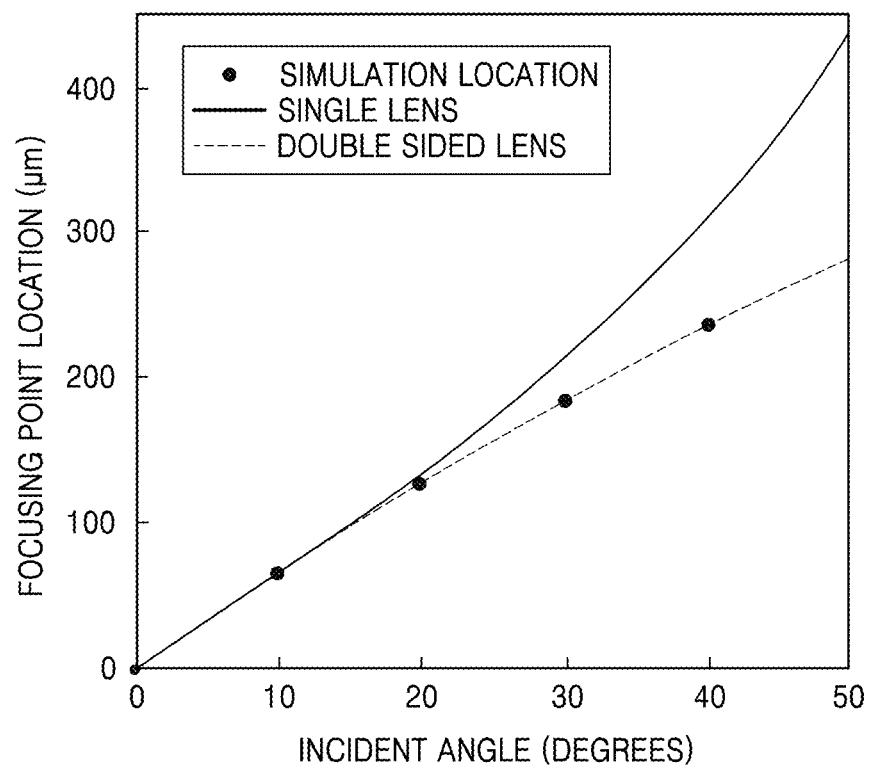
FIG. 14 is a graph of a relationship between locations of focusing points and incident angles of light.

FIG. 14 is a graph of a relationship between locations of focusing points and incident angles of light.

In FIG. 14, a solid line indicates the focusing device 100 forming a distortion free image, and a dashed line indicates the focusing device 100 provided as an orthographic fisheye lens. A location at which an image is formed according to incident angles of light may be changed by modifying designs of the plurality of first and the plurality of second scatterers 122 and 132. Accordingly, an image distortion degree and the FOV of the focusing device 100 may be adjusted. For example, when image accuracy is required, an image formed by light that passed through the focusing device 100 may be determined according to the solid line of FIG. 14. As another example, a wide FOV is required, an image formed by light that passed through the focusing device 100 may be determined according to the dashed line of FIG. 14.

The focusing device 100 of FIG. 5 may focus incident light according to wavelengths of incident light.

The first and second thin lenses 120 and 130 may differently change a direction of incident light according to wavelengths of the incident light. Therefore, the focusing device 100 according to an exemplary embodiment may only allow incident light within a certain wavelength band to form a focusing point on the focal plane S0. Also, the first and second thin lenses 120 and 130 may differently correct coma aberration according to the wavelengths of the incident light. A wavelength of light that is allowed by the focusing device 100 to form the focusing point on the focal plane S0 is a design wavelength of the focusing device 100.

Design conditions of the plurality of first and the plurality of second scatterers 122 and 132 may vary according to the wavelength of light that is to be focused by the focusing device 100, i.e., the design wavelength of the focusing device 100.

Figure 15:
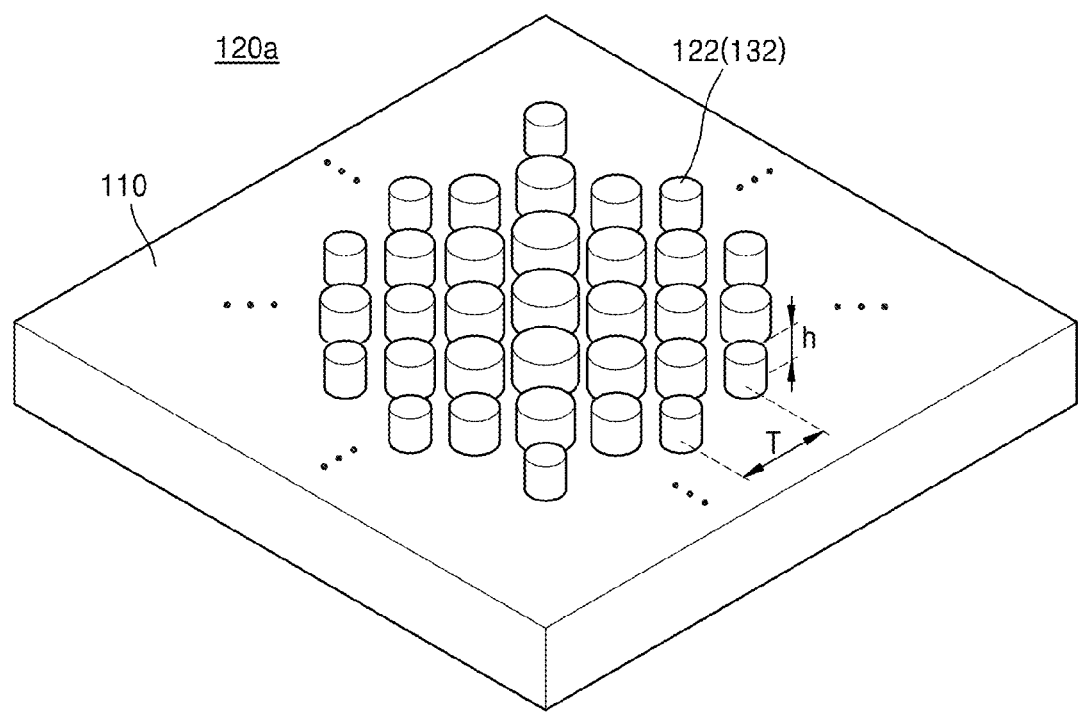
FIG. 15 is an exemplary diagram of an arrangement of first and second scatterers.

FIG. 15 is an exemplary diagram of an arrangement of the plurality of first and the plurality of second scatterers 122 and 132.

Referring to FIG. 15, intervals T between the plurality of first and the plurality of second scatterers 122 and 132, respective heights h of the plurality of first and the plurality of second scatterers 122 and 132, and an arrangement pattern of the plurality of first and the plurality of second scatterers 122 and 132 may be determined according to the design wavelength of the focusing device 100. The intervals T between the plurality of first and the plurality of second scatterers 122 and 132 may be less than the design wavelength. For example, the intervals between the plurality of first and the plurality of second scatterers 122 and 132 may be equal to or less than ¾ or ⅔ of the design wavelength. Also, the respective heights h of the plurality of first and the plurality of second scatterers 122 and 132 may be less than the design wavelength. For example, the respective heights h of the plurality of first and the plurality of second scatterers 122 and 132 may be equal to or less than ⅔ of the design wavelength.

Figure 16A:
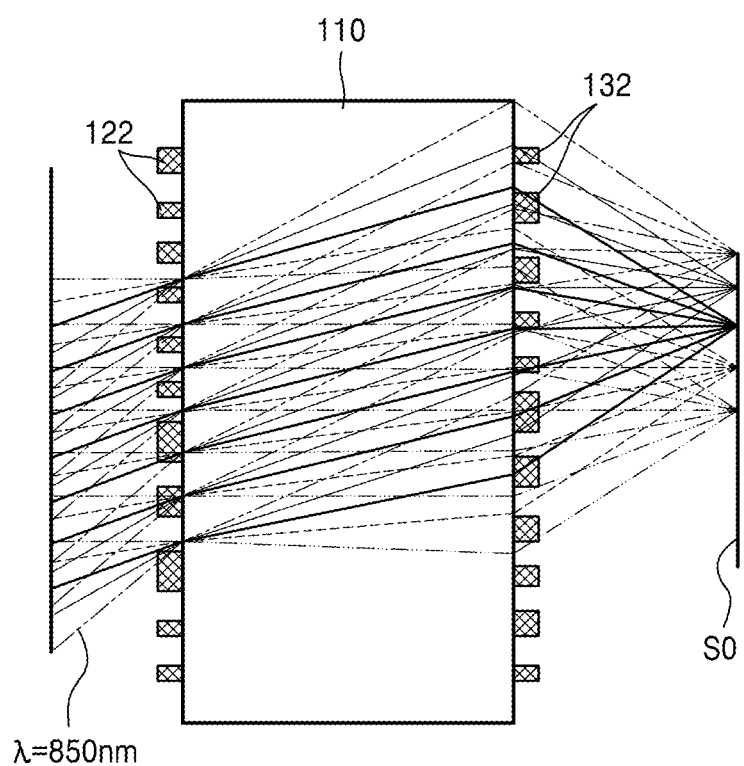
FIGS. 16A to 16C are diagrams for describing changes in paths of incident light according to wavelengths of the incident light.
Figure 16B:
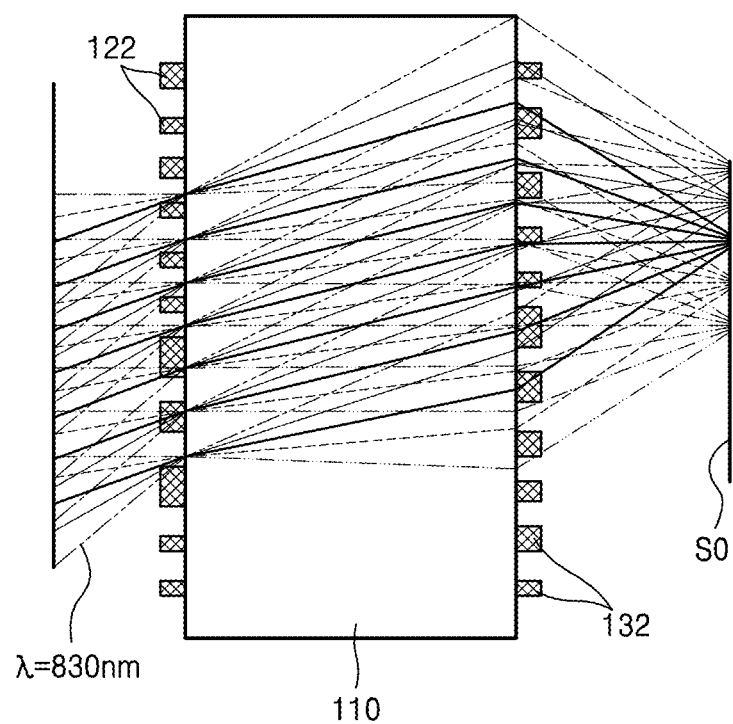
Figure 16C:
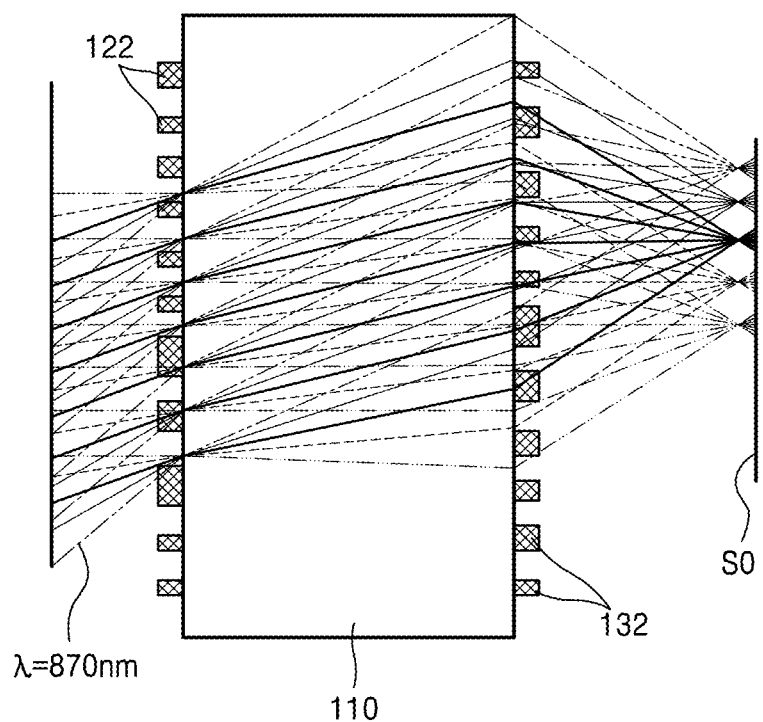

FIGS. 16A to 16C are diagrams for describing changes in path of incident light according to wavelengths of the incident light. The focusing device 100 of FIGS. 16A to 16C are designed to be appropriate for focusing about light having a wavelength of 850 nm.

Referring to FIG. 16A, when light having a wavelength that corresponds to the design wavelength of the focusing device 100 is incident, a focusing point of the light may be formed on the focal plane S0 regardless of an incident angle of the light. However, referring to FIG. 16B, when light having a wavelength (830 nm) that is less than the design wavelength is incident, the light may reach the focal plane S0 before a focusing point of the light is formed. Also, referring to FIG. 16C, when light having a wavelength (870 nm) that is greater than the design wavelength is incident, a focusing point may be formed before the light reaches the focal plane S0.

Figure 17A:
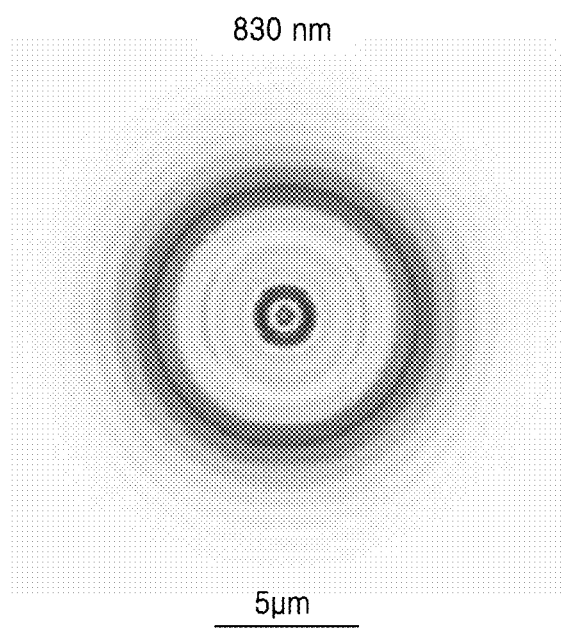
FIGS. 17A to 17C are diagrams of light intensity distribution of an image formed on a focal plane by light incident in parallel to an optical axis of a focusing device.
Figure 17B:
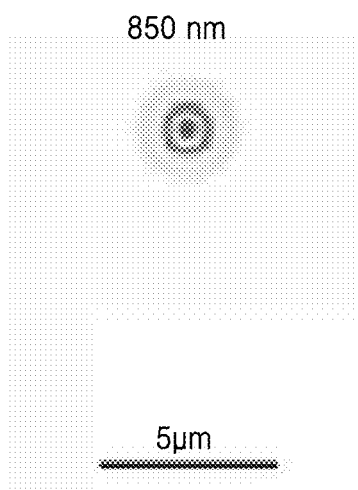
Figure 17C:
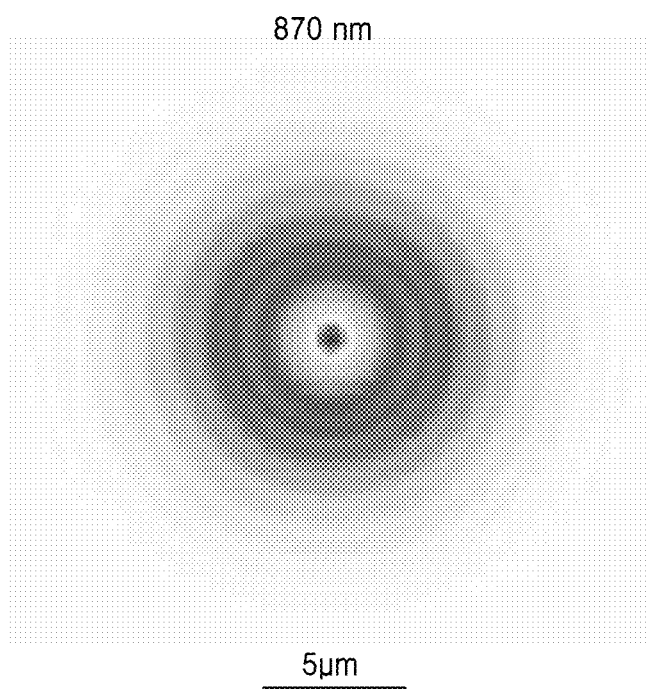

FIGS. 17A to 17C are diagrams of light intensity distribution of an image formed on the focal plane S0 by light incident in parallel to an optical axis of the focusing device 100.

Referring to FIG. 17B, an image formed by light having a wavelength (850 nm) corresponding to the design wavelength of the focusing device 100 may have narrow light intensity distribution. However, referring to FIGS. 17A and 17C, an image formed by light having a wavelength (830 nm or 870 nm) different from the design wavelength of the focusing device 100 may have wide light intensity distribution. That is, when the wavelength of incident light is different from the design wavelength of the focusing device 100, a focusing effect of the light incident in parallel to the optical axis of the focusing device 100 may decrease.

Figure 18:
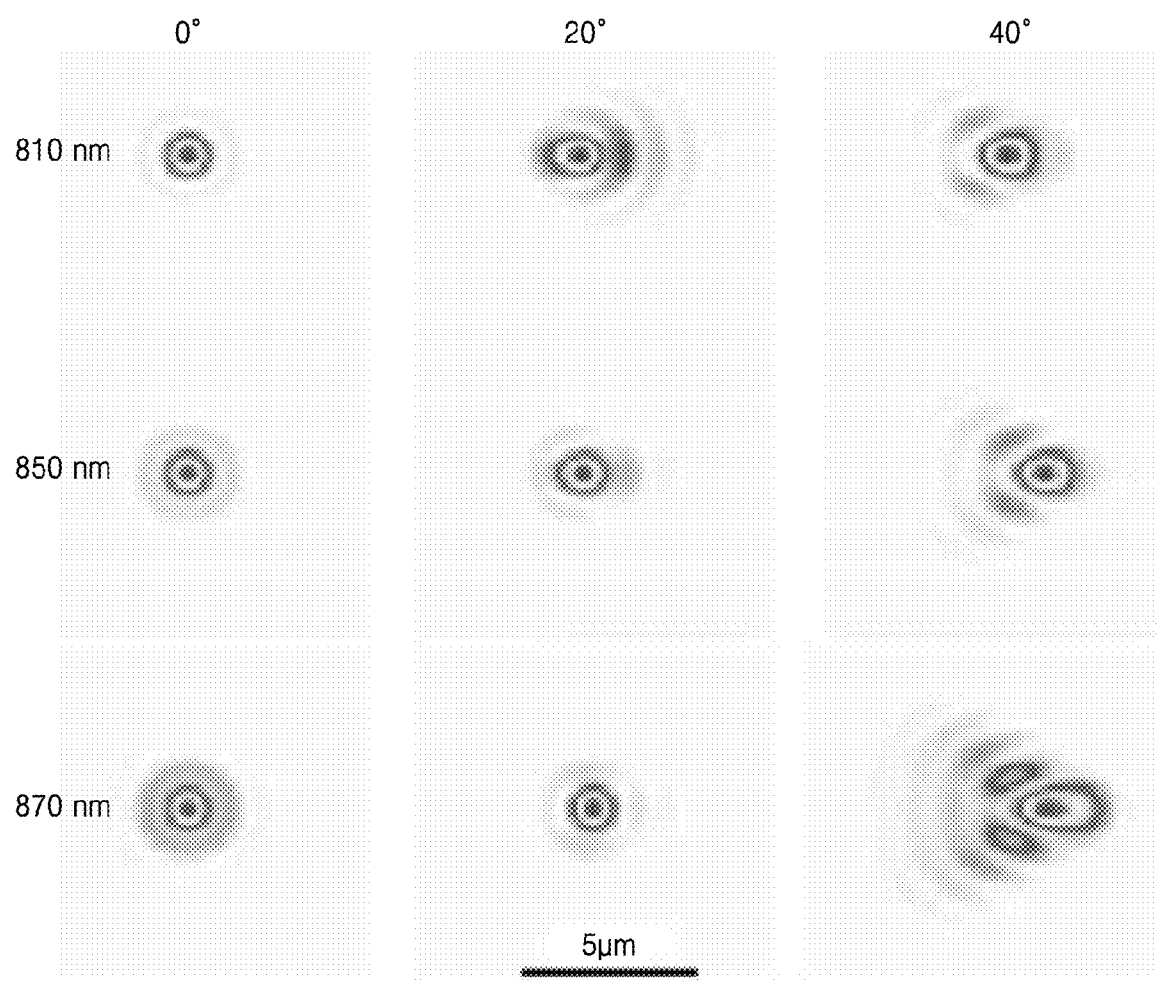
FIG. 18 is a diagram of changes in light intensity distribution of an image according to wavelengths and incident angles of incident light.

FIG. 18 is a diagram of changes in light intensity distribution of an image according to wavelengths and incident angles of incident light.

Referring to FIG. 18, when a wavelength of incident light corresponds to a design wavelength (850 nm), a focusing effect may not decrease until an incident angle reaches 20°. Also, when the incident angle is equal to 40°, light intensity distribution may change by a minor degree. However, when light has a wavelength of 810 nm, there may be a significant change in light intensity distribution as an incident angle changes to 20°. Also, when light has a wavelength of 870 nm, there may be a significant change in light intensity distribution as an incident angle changes to 40°. That is, when the wavelength of incident light is different from the design wavelength of the focusing device 100, the focusing device 100 may be less effective in correcting coma aberration.

Figure 19:
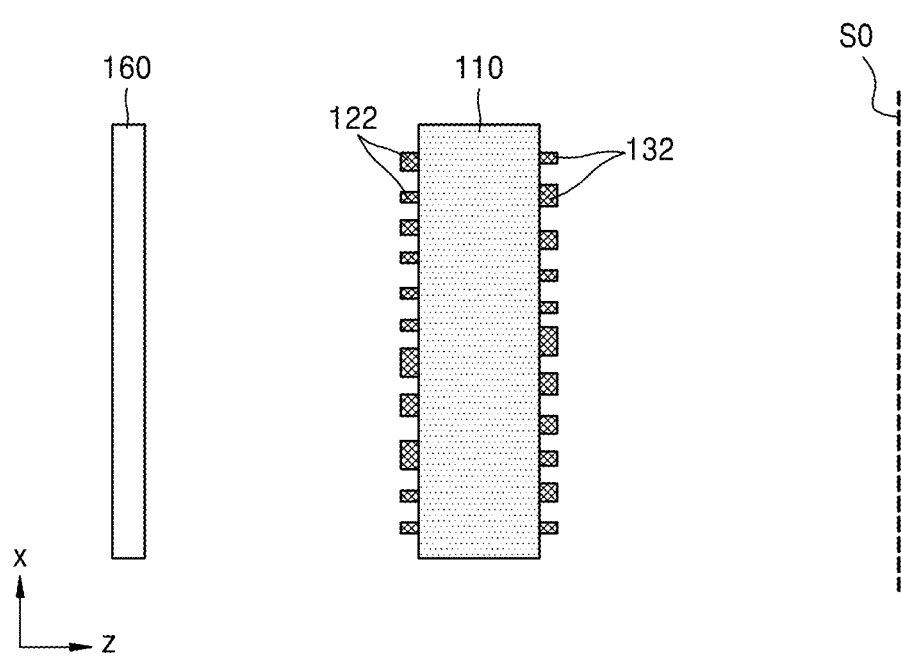
FIG. 19 is a diagram of a focusing device according to another exemplary embodiment.

FIG. 19 is a diagram of a focusing device 100 according to another exemplary embodiment.

Referring to FIG. 19, the focusing device 100 may include an optical filter 160 that blocks wavelengths of the incident light which are different from the design wavelength of the focusing device 100. The optical filter 160 may transmit light having a wavelength equal or similar to the design wavelength of the focusing device 100 from the incident light. Also, the optical filter 160 may reflect or absorb light having a wavelength that is not similar to the design wavelength. The optical filter 160 may filter the wavelength of incident light and thus prevent a light component with a weak focusing effect from reaching a focal plane S0.

Figure 20:
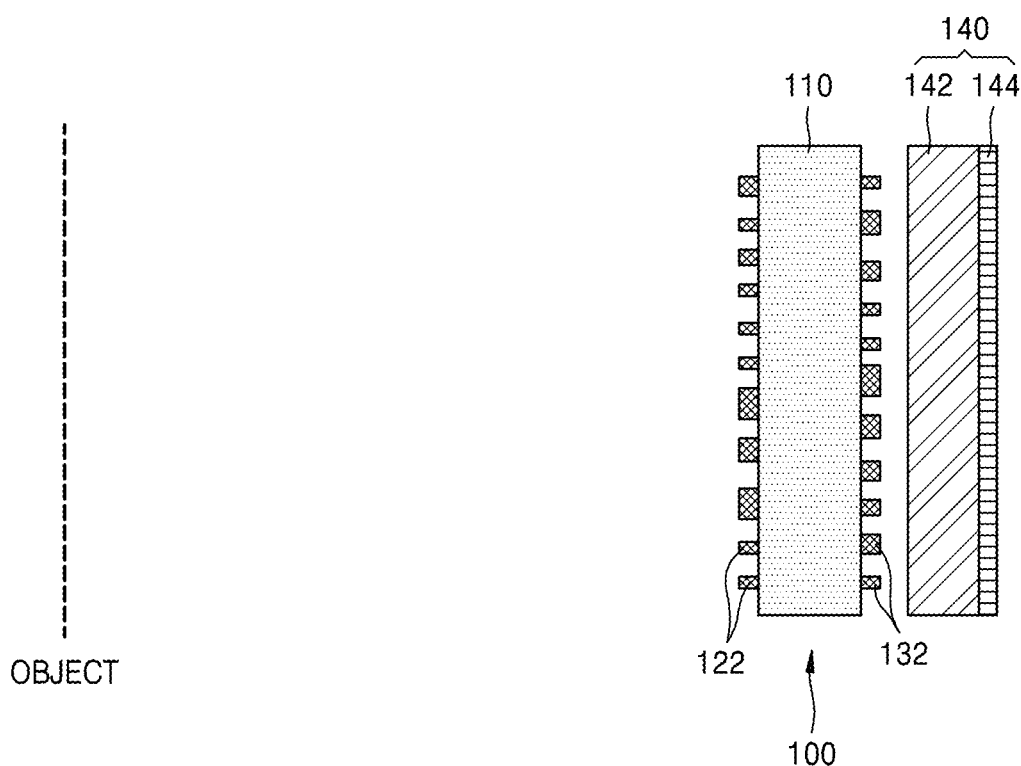
FIG. 20 is an imaging device according to another exemplary embodiment.

FIG. 20 is an imaging device according to another exemplary embodiment.

Referring to FIG. 20, the imaging device may include the focusing device 100 of FIG. 5, and an optical detector 140 that detects light that passed through the focusing device 100. The optical detector 140 may include an optical detection layer 144 provided at the focal plane S0 of the focusing device 100 and a cover glass 142 that protects the optical detection layer 144 and the optical detection layer 144. The optical detection layer 144 may include a plurality of charge-coupled devices (CCDs), complementary metal-oxide semiconductor (CMOS) sensors, photo diodes, etc. The optical detection layer 144 may convert optical signals incident on the optical detection layer 144 into electric signals.

Figure 21:
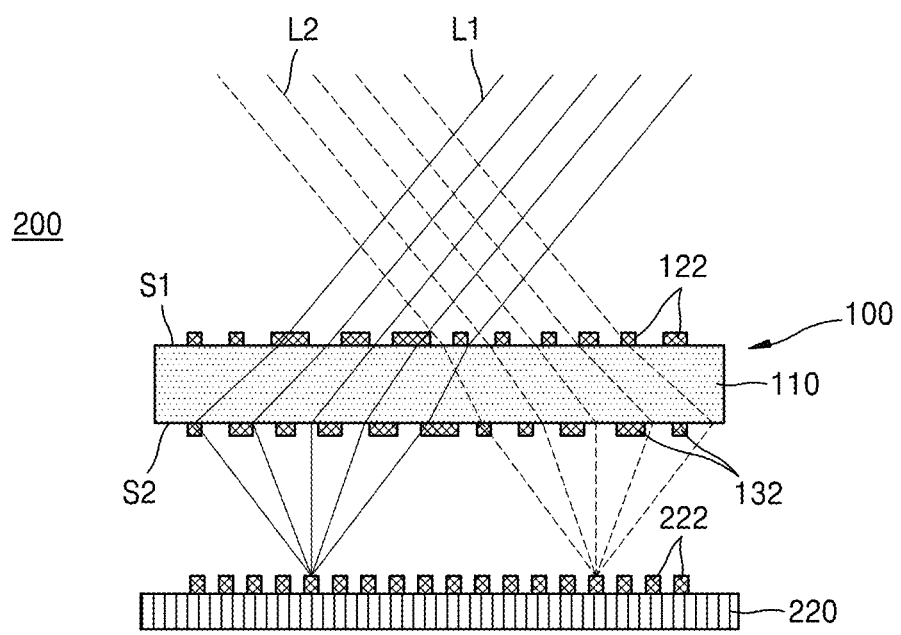
FIG. 21 is a diagram of a beam scanner according to an exemplary embodiment.

FIG. 21 is a diagram of a beam scanner 200 according to an exemplary embodiment.

Referring to FIG. 21, the beam scanner 200 may include the focusing device 100 of FIG. 5. Also, the beam scanner 200 may include a light source array 220 that includes a plurality of light sources 222. The light source array 220 may be provided at a location of the focal plane S0 of the focusing device 100 of FIG. 5. Therefore, a distance between the light source array 220 and the focusing device 100 may vary according to an effective focal length of the focusing device 100.

The focusing device 100 may focus incident light to another location according to an incident angle of the light incident on the first surface S1 of the substrate 110. Similarly, a path of light that passed through the focusing device 100 may change depending on respective locations of the plurality of light sources 222 emitting light from the light source array 220 facing the second surface S2 of the substrate 110. For example, as shown in FIG. 21, paths of light rays L1 and light rays L2 that passed through the focusing device 100 may change according to the respective locations of the plurality of light sources 222 emitting light. Also, the light rays L1 and L2 that passed through the focusing device 100 may be parallel rays. Therefore, the focusing device 100 may function as an optical path modifier of the beam scanner 200.

Since the first and second thin lenses 120 and 130 are designed to correct coma aberration of each other, the focusing device 100 may have a wide FOV. Accordingly, an area of the light source array 220 may be less limited. Also, the light source array 220 may adjust the respective locations of the plurality of light sources 222 and thus easily adjust direction of light emitted by the beam scanner 200.

Figure 22:
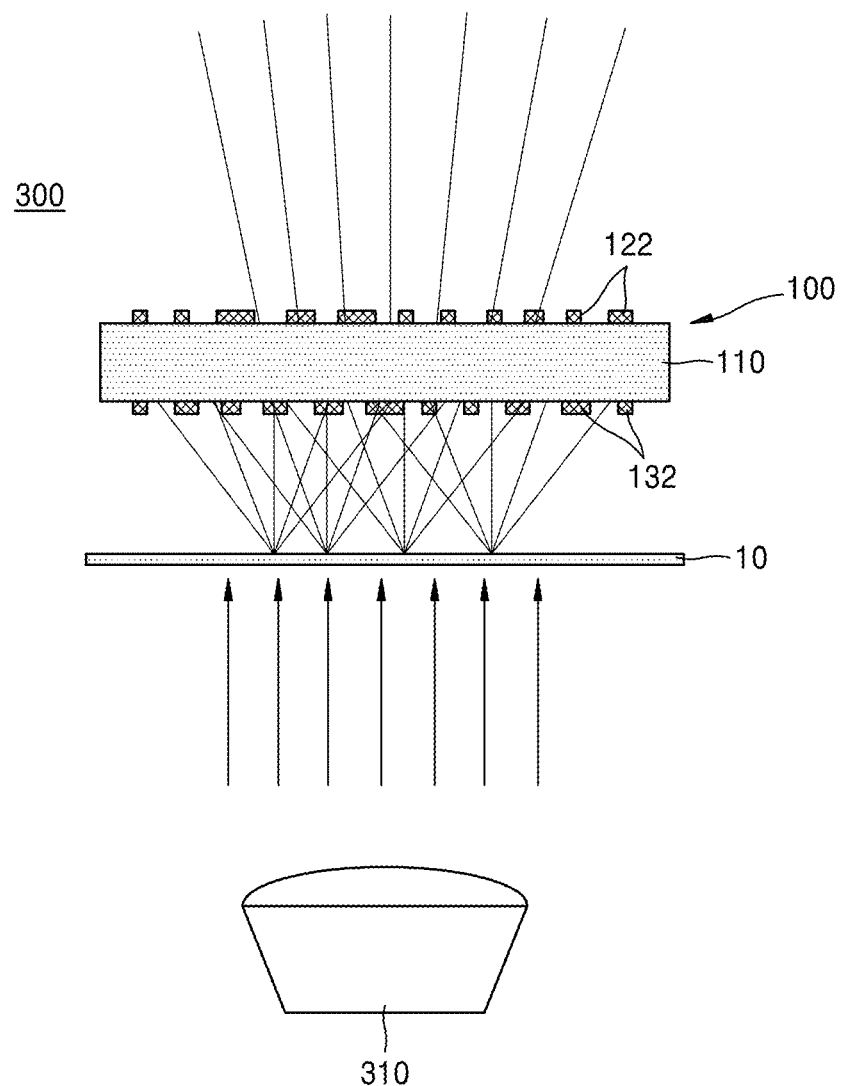
FIG. 22 is a diagram of a scope device according to another exemplary embodiment.

FIG. 22 is a diagram of a scope device 300 according to another exemplary embodiment. Referring to FIG. 22, the scope device 300 may include a focusing device 100, and a light source 310 arranged to face a second surface S2 of a substrate 110 of the focusing device 100 and emitting light on a target object 10. Light emitted from the light source 310 may pass through the target object 10 and be incident on the focusing device 100. Also, since the focusing device 100 may function as a focusing lens, the focusing device 100 may be used as an object lens of the scope device 300. In this case, the scope device 300 refers to a device for observing objects that are small or far away, such as a microscope or a telescope. Since the focusing device 100 has a wide FOV, the scope device 300 may observe a large area of the target object 10 without coma aberration.

Figure 23:
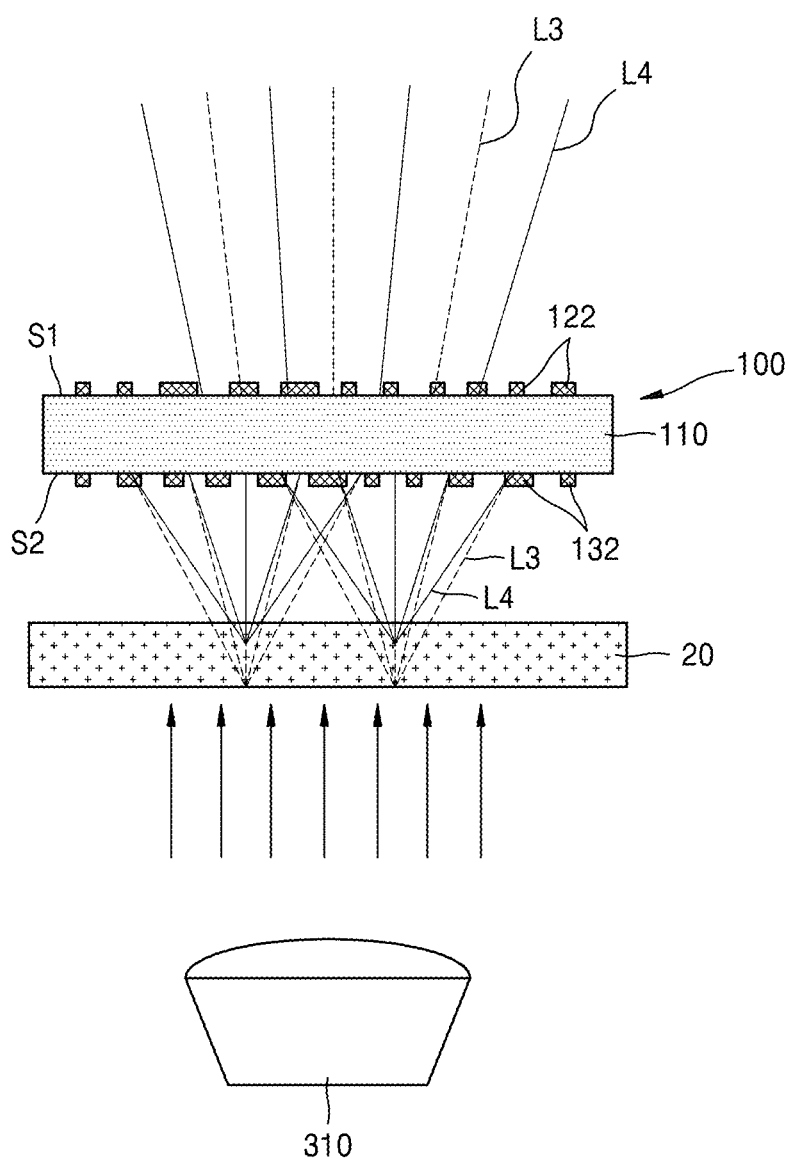
FIG. 23 is an exemplary diagram of observing a target object by using a scope device.

FIG. 23 is an exemplary diagram of 3-dimensional (3D) volumetric imaging a target object 20 by using the scope device 300.

Referring to FIG. 23, when the light source 310 emits light having various wavelengths on the target object 20, the focusing device 100 of the scope device 300 may function as an object lens that has different focal lengths with respect to the target object 20 according to the wavelengths of the light emitted from the light source 310. The light source 310 may emit light having different wavelengths on the target object 20 according to time variation. Alternatively, the light source 310 may simultaneously emit light having different wavelengths on the target object 20. The scope device 300 may divide light that passed through the target object 20 according to its wavelengths and record images of the target object 20. Also, the scope device 300 may analyze the images according to the wavelengths of light, and thus extract a 3D image including depth information of the target object 20.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A focusing device comprising:
   a substrate;
   a first thin lens provided at a first surface of the substrate and comprising a plurality of first scatterers; and
   a second thin lens provided at a second surface of the substrate and comprising a plurality of second scatterers,
   wherein the plurality of first scatterers of the first thin lens are configured to correct geometric aberration of the second thin lens.

2. The focusing device of claim 1, wherein the first and the second thin lenses are configured to allow light to form a focusing point on a focal plane.

3. The focusing device of claim 1, wherein a phase shift of light that passes through the plurality of second scatterers decreases from a central area of the second thin lens to a peripheral area of the second thin lens.

4. The focusing device of claim 3, wherein a phase shift of light that passes through the plurality of first scatterers decreases from a peripheral area of the first thin lens to a middle area of the first thin lens and increases from the middle area of the first thin lens to a central area of the first thin lens.

5. The focusing device of claim 2, wherein the first and the second thin lenses are configured to change a location of the focusing point according to an angle at which the light is incident on the first surface.

6. The focusing device of claim 5, wherein the first and the second thin lenses area configured to determine the location of the focusing point according to Equation 1:

$$h = f^* \tan \theta$$

wherein 'h' is a distance between the location of the focusing point and an optical axis of the focusing device, 'f' is an effective focal length of the focusing device, and 'θ' is an angle at which the light is incident on the first surface.

7. The focusing device of claim 1, wherein respective refractive indexes of the first and the second scatterers are greater than a refractive index of the substrate by at least 1.

8. The focusing device of claim 7, wherein the substrate comprises at least one selected from fused silica, BK7, quartz, polymethyl methacrylate (PMMA), SU-8, and plastic, and the first and second scatterers comprise at least one selected from crystalline silicon (c-Si), polycrystalline silicon (poly Si), amorphous silicon (a-Si), $Si_3N_4$, GaP, GaAs, $TiO_2$, AlSb, AlAs, AlGaAs, AlGaInP, BP, and $ZnGeP_2$.

9. The focusing device of claim 1, wherein the plurality of first and the plurality of second scatterers are configured to allow incident light within a wavelength band to form a focusing point on a focal plane.

10. The focusing device of claim 9, wherein distances between the plurality of first scatterers and distances between the plurality of second scatterers are less than wavelengths in the wavelength band.

11. The focusing device of claim 9, wherein respective heights of the plurality of first scatterers and respective heights of the plurality of second scatterers are less than wavelengths in the wavelength band.

12. The focusing device of claim 9, further comprising an optical filter configured to block the incident light of wavelengths outside the wavelength band.

13. The focusing device of claim 1, wherein at least one of respective shapes of the plurality of first and the plurality of second scatterers and respective sizes of the plurality of first and the plurality of second scatterers changes according to a thickness of the substrate.

14. The focusing device of claim 1, wherein each of the plurality of first and the plurality of second scatterers has at least one of a cylindrical shape, an cylindroid shape, and a polyhedral pillar shape.

15. A beam scanner comprising:
   an optical path modifier comprising a substrate, a first thin lens provided at a first surface of the substrate and comprising a plurality of first scatterers, and a second thin lens provided at a second surface of the substrate and comprising a plurality of second scatterers; and
   a light source array spaced apart from the second surface of the substrate and comprising a plurality of light sources,
   wherein the plurality of first scatterers of the first thin lens are configured to correct coma aberration of the second thin lens.

16. The beam scanner of claim 15, wherein the optical path modifier changes a path of light emitted from the plurality of light sources according to respective locations of the light sources.

17. The beam scanner of claim 15, wherein the optical path modifier modifies light emitted from one of the plurality of light sources into parallel rays.

18. A scope device comprising:
an object lens unit comprising a substrate;
a first thin lens provided at a first surface of the substrate and comprising a plurality of first scatterers, and a second thin lens provided at a second surface of the substrate and comprising a plurality of second scatterers; and
a light source facing the second surface of the substrate and configured to emit light on a target object,
wherein the plurality of first scatterers of the first thin lens are configured to correct coma aberration of the second thin lens.

19. The scope device of 18, wherein light emitted by the light source has at least two wavelengths with different transmission rates with respect to the target object.

20. The scope device of claim 19, wherein the light emitted by the light source is scattered at different locations by the target object according to wavelengths of the light emitted by the light source, and
the object lens unit is configured to change a path of the light according to the locations at which the light is scattered by the target object.

\* \* \* \* \*